United States Patent [19]

Altier

[11] 4,439,946
[45] Apr. 3, 1984

[54] BOOSTER SPRINGS FOR COIL SPRING TRAP

[76] Inventor: Anthony L. Altier, Rte. 6, P.O. Box 286, Honesdale, Pa. 18431

[21] Appl. No.: 397,231

[22] Filed: Jul. 12, 1982

[51] Int. Cl.³ ............................................ A01M 23/30
[52] U.S. Cl. .......................................... 43/81; 16/76; 43/82; 267/155
[58] Field of Search ........................ 267/58, 59, 60, 66, 267/155, 156, 169, 174; 280/722; 16/76, 77, 256, 283, 285, 295; 43/81, 82, 92, 93, 94

[56] References Cited

U.S. PATENT DOCUMENTS

| 877,134 | 1/1908 | Sprague et al. | 43/93 |
| 1,634,270 | 7/1927 | Samouce | 43/92 |
| 1,937,854 | 12/1933 | Stratton | 267/60 X |
| 1,960,122 | 5/1934 | Pitre et al. | 43/88 |
| 2,489,095 | 11/1949 | Lienhard | 43/92 |
| 2,823,413 | 2/1958 | Stewart | 267/155 X |
| 3,658,284 | 4/1972 | Haasl | 16/76 X |
| 4,027,899 | 6/1977 | Hawes | 267/155 X |
| 4,240,223 | 12/1980 | Medvetz | 43/92 |

FOREIGN PATENT DOCUMENTS

| 613774 | 5/1935 | Fed. Rep. of Germany | 267/60 |
| 10818 | 8/1909 | France | 267/60 |

*Primary Examiner*—George E. A. Halvosa
*Attorney, Agent, or Firm*—Dennison, Meserole, Pollack & Scheiner

[57] ABSTRACT

An accessory for coil spring traps utilized in enhancing the spring strength of the trap and including a spring mounting frame capable of accommodating either one or two booster springs. The spring mounting frame includes a base bar with a pair of laterally spaced sleeves projecting therefrom for mounting reception over the normally extending free ends of the spring frame of a coil spring trap. The sleeves in turn mount auxiliary coil springs, the opposed projecting ends of which engage beneath the trap across member and one of the jaw manipulating follower plates.

6 Claims, 6 Drawing Figures

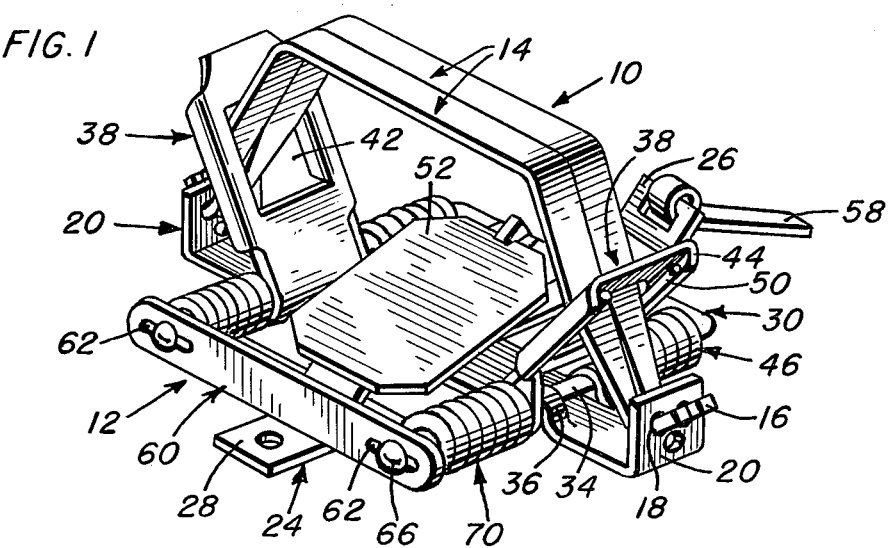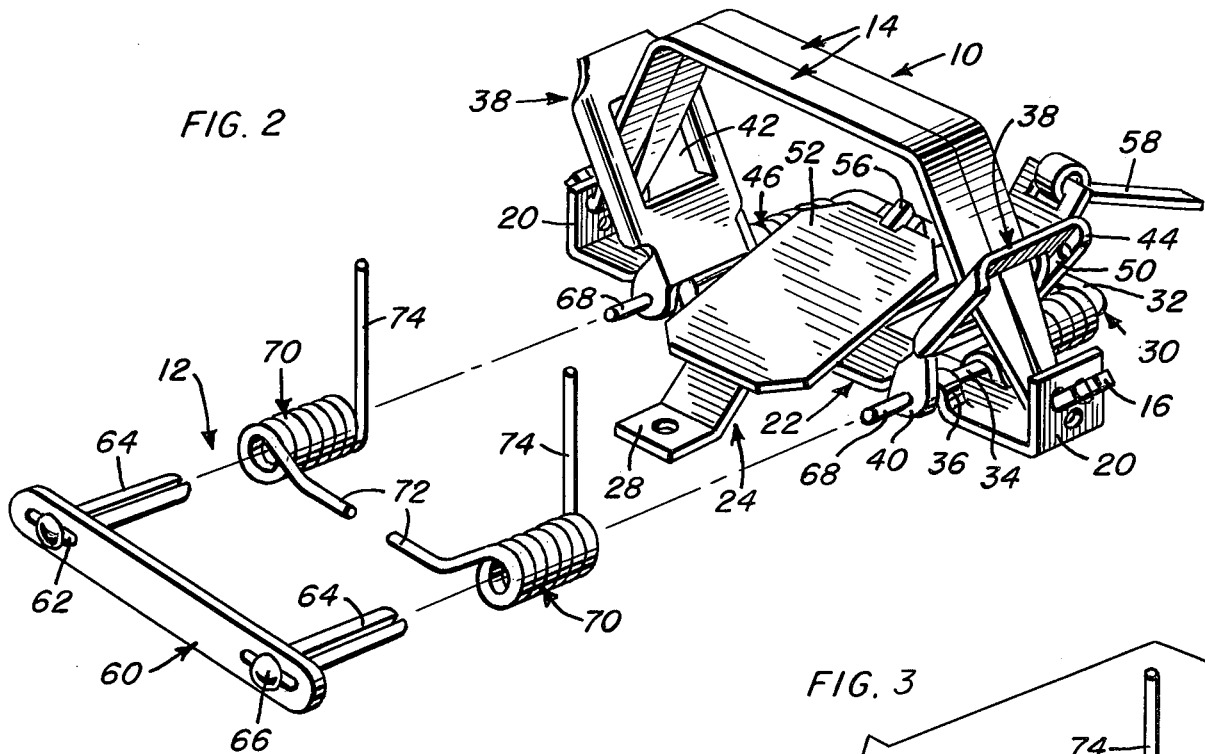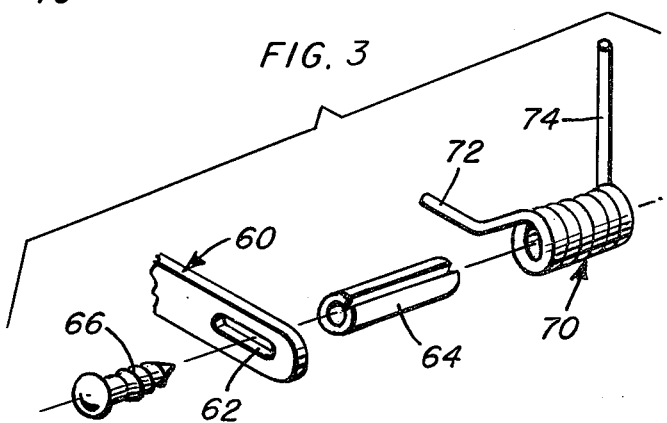

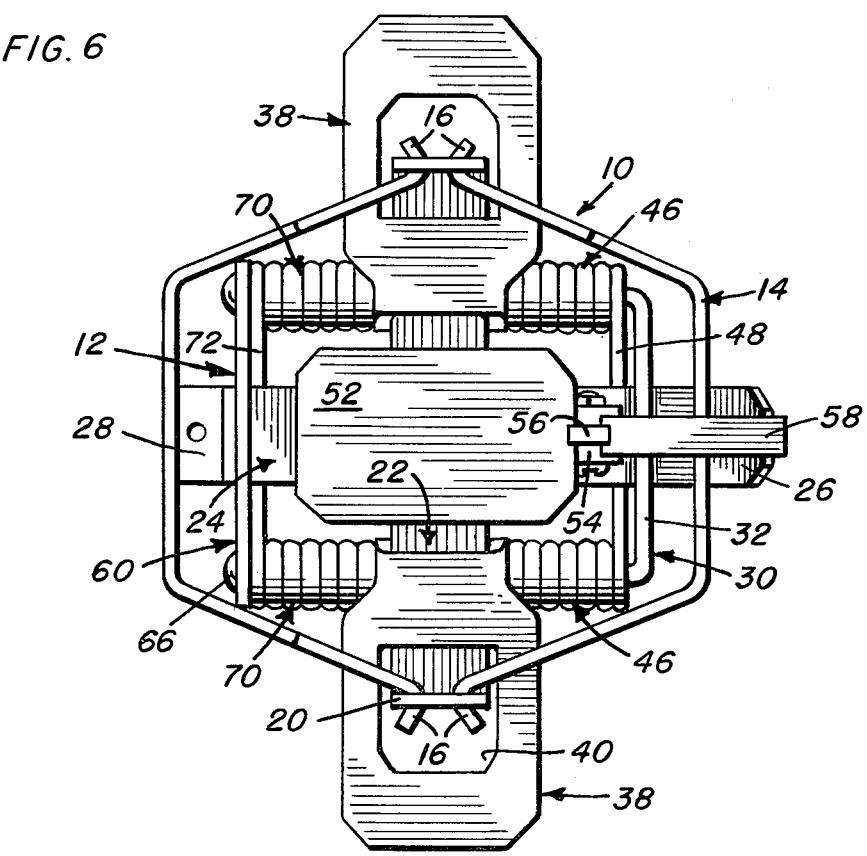

BOOSTER SPRINGS FOR COIL SPRING TRAP

BACKGROUND OF THE INVENTION

The present invention is generally concerned with animal traps, and more particularly relates to coil spring traps. Such traps basically consist of a pair of opposed U-shaped jaws spring-loaded by a pair of coiled springs for movement between an open loaded or set position and a closed or sprung position. The loaded jaws are normally locked in position by a pivoted dog latched to a trip plate for release upon the introduction of an animal weight to the trip plate. Examples of such two or dual-spring traps will be noted in the following patents:

U.S. Pat. No. 2,489,095 Lienhard dated Nov. 22, 1949
U.S. Pat. No. 4,240,223 Medvetz et al dated Dec. 23, 1980

Such traps are particularly favored by trappers, being both easy to set and conceal. In addition, traps of this type are sturdy and have both the speed and power to operate in dirt sets. However, over extended periods of use, the springs of such traps tend to rust and otherwise weaken, thus lessening the effective operation and holding power of the trap. Once the springs become ineffective, it becomes necessary to either replace the springs, a relatively difficult task requiring a complete disassembly of the trap, or replace the entire trap.

Further, while the two-spring trap construction, assuming no spring deterioration, has been found to be highly effective, occasions arise wherein a greater spring load is desired. This in turn necessitates acquiring a separate larger or more powerful trap. In this regard, note the slightly differently configured four-spring traps of the following patents:

U.S. Pat. No. 1,634,270 Samouce dated July 5, 1927
U.S. Pat. No. 1,960,122 Pitre et al dated May 22, 1934

Heretofore, there has been no effective means for enhancing the capability of dual coil spring traps.

SUMMARY OF THE INVENTION

It is the purpose of the present invention to provide a booster spring accessory unit which readily adapts to and conveniently mounts on a standard two-spring trap. The accessory is multifunctional in that it can be used to selectively enhance the power of the trap and, possibly more importantly, restore original capability to an older weakened trap, in effect replacing the original jaw-controlling springs with newly mounted springs. This is effected without requiring removal of the original springs or disassembly of the trap.

Basically, the booster spring accessory unit includes an elongated base bar with a pair of laterally spaced parallel mounting sleeves projecting perpendicularly therefrom. The sleeves, each of which is adapted to extend through the coils of a coil spring with opposed free ends, mount on the normally present projecting free ends on the spring mounting frame of the standard two-spring trap. The sleeve mounted booster springs are in turn manipulated to engage the ends thereof respectively in a manner similar to the original trap springs, that is with one leg of each spring beneath one of the base members of the trap and the other leg behind one of the jaw controlling plates.

The accessory, when mounted, is positively retained against accidental release, and, at the same time, is readily disengagable. Further, the accessory is particularly adapted to mount either one or two booster springs as desired.

Utilized in the manner proposed, the accessory unit is uniquely adapted to rehabilitate old traps or, alternatively, effectively vary the power of any trap, whether new or old.

Additional objects and advantages of the invention will become apparent from the details of construction and manner of use as more fully hereinafter described and claims.

BRIEF DESCRIPTION OF DRAWINGS

FIG. 1 is a top perspective view of a two-spring trap with the booster spring accessory unit of the present invention incorporated therein;

FIG. 2 is a perspective view similar to FIG. 1 with the accessory unit exploded outward therefrom;

FIG. 3 is an exploded detail of the components of the accessory unit;

FIG. 4 is a cross-sectional detail through the mounted accessory unit;

FIG. 5 is a bottom perspective view of the trap with the accessory unit mounted thereon; and FIG. 6 is a top plan view of the open trap with the accessory unit mounted thereon.

DESCRIPTION OF THE PREFERRED EMBODIMENT

Referring now more specifically to the drawings, the basic two-spring coil spring trap is designated by reference numeral 10. The booster spring accessory or accessory unit, which alone and in combination with the basic trap constitutes the present invention, is designated by reference numeral 12.

Referring initially to the trap 10, as is standard, this trap include a pair of generally U-shaped jaws 14 having laterally directed outer ends 16 rotatably received through apertures 18 in the upturned ends or jaw posts 20 of an elongated bottom member 22.

A cross member 24 centrally overlies and is rigidly affixed to the bottom member 22. This cross member 24 terminates in a first upwardly offset end portion 26 laterally beyond one side of the bottom member 22, and in a second downwardly ofset end portion 28 positioned laterally beyond the opposite side of the bottom member 22.

A U-shaped spring frame 30 is positioned with the bight portion 32 thereof transversely overlying the cross member 24 inward of the first upturned end 26 and normally received within a stabilizing groove defined within the cross member. The opposed legs 34 of the spring frame 30 overlie the bottom member 22 to the opposed sides of the cross member 24 and are received through and retained by upwardly projecting retaining ears 36 on the bottom member 22. These legs 34, noting FIG. 2 in particular, normally project a substantial distance beyond the opposite side of the bottom member 22 from the bight 32.

Each of the spring frame legs 34 pivotally mounts a spring follower plate 38. This is achieved by, a pair of depending apertured mounting ears 40 on each plate 38 which are positioned immediately outward of the bottom member 22 and receive the corresponding spring frame leg 34 therethrough. Each plate includes an enlarged central aperture 42 therethrough with the plate extending outwardly in overlying relation to the corresponding end portion of the bottom member 22 for reception of the corresponding pair of jaw legs through the plate aperture 42. Each plate 38, as will be apparent from the drawings, also includes downwardly curled side flanges 44 along the opposed longitudinal edges thereof.

The two coil springs which provide the closing force for the trap 10 are designated by reference numeral 46. One of the springs 46 is mounted on each of the legs 34 of the spring frame 30 between the bight portion 32 of the spring frame and the adjoining edge of the bottom member 22. A first end 48 of each coil spring 46 projects laterally therefrom, includes a slight offset therein, and engages beneath the cross member 24 immediately inward of the spring frame bight 32. The second end portion 50 of each of the springs 46 is engaged, under tension, beneath the adjacent flanged edge 44 of the corresponding spring follower plate 38.

The two coil springs 46, as will be best appreciated from FIGS. 1 and 2, bias the spring follower plates 38 upward and, through engagement with the jaw 14, inwardly close the jaws relative to each other. The strength of the springs 46 will dictate the closing force of the jaws 14 and the holding strength thereof.

The trigger mechanism for the trap includes a trip plate or pan 52 overlying the central portion of the trap below the jaws 14. This pan 52 is pivotally mounted for vertical movement to a post 54 projecting upwardly from the cross member 24 slightly inward of the bight portion 32 of the spring frame 30. The pan 52 includes a latch or detent 56 thereon which cooperates with the end of a jaw retaining dog 58. The dog 58, is, in return, pivotally engaged with the upturned end 26 of the cross member 24 and selectively swung into overlying relation to the corresponding jaw 14 when in its open or loaded position, as best seen in FIG. 6. As will be appreciated, the opening of the jaws, through the spring follower plates, is effected simultaneously with both coil springs 46 being compressed. Retention of one jaw by the dog 58 effectively retains both jaws in the open or set position. The trap will remain in this open or set position of FIG. 6 until a weight is introduced onto the pan 52, triggering a release of the jaw retaining dog 58, followed by a spring biased rapid closing of the jaws 14.

As previously indicated, traps of this type are generally known and considered highly effective. However, for various reasons, including repeated use, weathering, rusting, and the like, the original coil springs 46 tend to lose strength, thus reducing efficiency of the trap. The booster spring unit 12 of the present invention is specifically provided as a means for rehabilitating such traps. Secondarily, the booster spring unit 12 provides a highly effective means to selectively vary the strength of any such trap, whether or not a weakening thereof has occurred.

The accessory unit 12 consists of a flat elongated base bar 60 having longitudinally elongated slots 62 therethrough generally inward of the opposed ends of the bar 60. An elongated sleeve 64 is associated with each slot 62 and mounted to project perpendicularly from the base bar 60 in alignment with the corresponding slot 62 for lateral adjustment therealong. The mounting of each sleeve, noting FIGS. 3 and 4 in particular, can be effected by a headed gripping pin or screw-like member 66 engaged through the corresponding slot 62 into the adjacent end portion of the sleeve 64. Both the head of the pin 66 and the sleeve 64 are of a size to preclude passage through the slot 62. The engagement of each pin within the sleeve end portion is such as to closely engage the corresponding end of the sleeve 64 against the face of the base bar in a manner which stabilizes the pin relative to the base bar while allowing for lateral movement and adjustment of the sleeve throughout the extent of the corresponding slot 62.

The outer open ends of the sleeves 64 closely slidably engage over the projecting free end portions of the opposed legs 34 of the spring frame 30. Such free end portions are commonly present in traps of the type illustrated and, for disclosure purposes, have been herein designated by reference numeral 68. If so desired, the sleeves 64 can be longitudinally split, providing some degree of inherent resiliency for possibly more effective engagement with the mounting pins 66 and spring frame end portions 68. The adjustability of the sleeves 64, through the slots 62, is significant in ensuring proper accommodation to any possible variances in the lateral spacings of the end portions 68.

The booster springs themselves are designated by reference numeral 70, each spring being in the nature of a coil spring with opposed projecting end portions or legs 72 and 74. As a practical matter, the springs 70 are quite similar in appearance, construction and strength to the originally provided springs 46. Each sleeve 64 is adapted to accommodate one of the springs 70 thereon, engaging through the coils thereof. Each mounted spring in turn has a first leg 72 thereof, normally provided with an offset, engaged, upon a mounting of the accessory unit, beneath the cross member 24 immediately inward of the downwardly offset end portion 28. The second straight leg member 74 is, normally as a final step in mounting the accessory unit 12, tensioned and forcibly engaged beneath the second flanged edge of the corresponding spring follower plate 38 parallel to the original spring leg 50. Depending upon the additional strength or spring power desired, either one or two booster springs 70 can be used.

In mounting the accessory unit 12, either one or two booster springs 70 are slid onto the corresponding sleeves 64, the sleeves 64 laterally adjusted to align with the free end portions 68, and the unit 12 slid inward to engage the free end portions 68 within the sleeve 64. The offset leg 72 of each booster spring 70 is engaged beneath the cross member 24 immediately inward of the downwardly offset end portion 28 with the accessory unit base bar 60 seating on top of this end portion 28. The completion of the mounting of the accessory involves an engagement of each spring leg 74 behind the corresponding spring follower plate 38. This requires a tensioning of the spring which can be easily effected by an appropriate pry bar or screwdriver. Removal or replacement of the accessory unit 12 similarly presents no difficulties. Incidentally, it will be recognized that the accessory unit 12, when mounted, is firmly maintained in position by the tension generated in the positioned booster spring or springs 70, in conjunction with the manner in which the legs 72 and 74 thereof engage both behind the edge flanges of the spring follower plates 38 and behind the downwardly offset end portion 28 of the cross member 24.

From the foregoing, it will be appreciated that a unique device has been defined, the device being particularly adapted for the rehabilitation of weakened two-spring coil spring traps in a functionally simple and economically feasible manner. Similarly, the booster spring unit, adapted to mount on the conventionally exposed free end portions of the spring frame of a dual-spring trap, also provides a convenient means, through the selective mounting of one or two booster springs, for varying the strength of the trap, as opposed to merely revitalizing a worn or weakened trap.

The foregoing is considered illustrative of the principles of the invention. As modifications and variations may occur to those skilled in the art, it is not desired to limit the invention to the exact construction and manner of use as shown and described. Rather, all suitable modifications and equivalents may be resorted to as fall within the scope of the invention as claimed.

I claim:

1. In a two-spring trap having a pair of jaws, a U-shaped spring frame with a bight portion to one side of the jaws and a pair of opposed legs extending from the bight portion laterally toward the jaws, a follower plate pivotally mounted on each leg and engaged with the jaws, a single coil spring mounted on each leg between the follower plate and the bight portion and engaging the follower plate with a resilient biasing force, each leg including a portion extending beyond the follower plate a length substantially less than the length of leg receiving the coil spring; the improvement comprising means for increasing extension of said legs beyond the follower plates, said means comprising a pair of spring mounting members, each spring mounting member being elongated and including a tubular open end portion telescopically receivable over the extending portion of one of said legs of the spring frame, and a pair of second coil springs, each mountable on one of the spring mounting members for biasing engagement with a follower plate, each second coil spring including a first laterally extending tensioning leg engageable with a follower plate for enhancing the biasing force thereon, and a second laterally extending spring stabilizing leg engageable with a fixed portion of the trap.

2. In the construction of claim 1, the further improvement wherein said means for increasing extension of said legs comprises a rigid base, each of said spring mounting members having a second end remote from the open end portion and adjacent said base, and means engaged with said second ends and mounting said spring mounting members on said base for lateral adjustment relative to each other.

3. In the construction of claim 2, the further improvement wherein said means mounting said spring mounting members on said base for lateral adjustment includes a pair of elongated slots defined through said base, and a retaining pin engaged through each slot and into the second end of one of the spring mounting members.

4. A booster spring kit having component parts capable of being assembled to a two-spring trap incorporating a pair of jaws, a U-shaped spring frame with a bight portion to one side of the jaws and a pair of opposed legs extending from the bight portion laterally toward the jaws, a follower plate pivotally mounted on each leg and engaged with the jaws, a single coil spring mounted on each leg between the follower plate and the bight portion and engaging the follower plate with a resilient biasing force, and wherein each leg includes a portion extending beyond the follower plate a length substantially less than the length of leg receiving the coil spring; the kit comprising the combination of means for increasing extension of said legs beyond the follower plate, said means comprising a pair of spring mounting members, each spring mounting member being elongated and including a tubular open end portion telescopically receivable over the extending portion of one of the legs of the spring frame, and a pair of second coil springs each mountable on one of the spring mounting members for biasing engagement with a follower plate, each second coil spring including a first laterally extending tensioning leg engageable with a follower plate for enhancing the biasing force thereon, and a second laterally extending spring stabilizing leg engageable with a fixed portion of the trap.

5. The kit of claim 4 wherein said means for increasing extension of said legs comprises a rigid base, each of said spring mounting members having a second end remote from the open end portion and adjacent said base, and means engaged with said second ends and mounting said spring mounting members on said base for lateral adjustment relative to each other.

6. The kit of claim 5 wherein said means mounting said spring mounting members on said base for lateral adjustment includes a pair of elongated slots defined through said base, and a retaining pin engaged through each slot and into the second end of one of the spring mounting members.

* * * * *